(12) United States Patent (10) Patent No.: US 8,992,113 B2
Campagna et al. (45) Date of Patent: Mar. 31, 2015

(54) ROBUST MANUAL CONNECTOR FOR ROBOTIC ARM END EFFECTOR

(75) Inventors: Frank F. Campagna, Mars, PA (US); Nabil Michael Rizk, Salt Lake City, UT (US); Keith M. Gunnett, Allison Park, PA (US)

(73) Assignee: RE2, Inc., Pittsburgh, PA (US)

( * ) Notice: Subject to any disclaimer, the term of this patent is extended or adjusted under 35 U.S.C. 154(b) by 723 days.

(21) Appl. No.: 12/794,061

(22) Filed: Jun. 4, 2010

(65) Prior Publication Data

US 2010/0307279 A1 Dec. 9, 2010

Related U.S. Application Data

(60) Provisional application No. 61/268,085, filed on Jun. 8, 2009.

(51) Int. Cl.
 *B25J 15/04* (2006.01)
(52) U.S. Cl.
 CPC ............... *B25J 15/04* (2013.01); *Y10S 901/30* (2013.01); *Y10S 901/50* (2013.01)
 USPC ................................ 403/349; 901/30; 901/50
(58) Field of Classification Search
 USPC .................. 403/348, 349; 74/490.01, 490.02, 74/490.05; 901/27, 28, 29, 30, 50
 See application file for complete search history.

(56) References Cited

U.S. PATENT DOCUMENTS

| | | | |
|---|---|---|---|
| 2,103,379 A | 12/1937 | Oxford | |
| 2,511,416 A | 6/1950 | Rundorff | |
| 2,525,695 A * | 10/1950 | Lombard | 464/158 |
| 3,229,656 A * | 1/1966 | Bodey | 114/268 |
| 3,287,031 A * | 11/1966 | Simmons et al. | 403/349 X |
| 3,478,302 A * | 11/1969 | Chirumbolo | 403/349 X |
| 3,680,436 A | 8/1972 | Marsland | |
| 3,845,963 A | 11/1974 | Price | |
| 4,076,361 A * | 2/1978 | Campbell | |
| 4,124,318 A | 11/1978 | Sagady | |
| 4,188,942 A | 2/1980 | Fehlberg | |
| 4,238,167 A | 12/1980 | Brugger et al. | |
| 4,274,774 A | 6/1981 | Haga et al. | |
| 4,429,938 A * | 2/1984 | Flor | 403/349 X |
| 4,502,808 A | 3/1985 | Didion et al. | |
| 4,512,709 A * | 4/1985 | Hennekes et al. | |
| 4,525,918 A * | 7/1985 | Puritz | 901/50 X |
| 4,551,903 A | 11/1985 | Bisiach | |
| 4,636,135 A | 1/1987 | Bancon | |
| 4,640,639 A | 2/1987 | Matsui | |
| 4,664,588 A | 5/1987 | Newell et al. | |
| 4,668,119 A | 5/1987 | Galletti | |
| 4,710,093 A | 12/1987 | Zimmer et al. | |

(Continued)

*Primary Examiner* — Michael P Ferguson
*Assistant Examiner* — Matthieu Setliff
(74) *Attorney, Agent, or Firm* — The Webb Law Firm

(57) ABSTRACT

An assembly for releasably connecting an end effector in the form of a robotic tool or component to a robotic arm is disclosed. The connection is manually operated and formed of a first and second joint member including a cylindrical body, a locking collar, and a locking wall extending from the cylindrical body. The locking collar is coaxially aligned with and rotatably connected to the first joint member. The second joint member has a cylindrical mating body and a coupler, and engages the first joint member. The coupler also includes key pins, the pins being engageable in keyed relationship with the locking wall, the coupler and locking collar further includes intervening circumferentially spaced teeth, wherein the collar is rotatable to releasably engage the first joint member with the second joint member.

16 Claims, 14 Drawing Sheets

(56) References Cited

U.S. PATENT DOCUMENTS

| | | |
|---|---|---|
| 4,756,638 A | 7/1988 | Neyret |
| 4,758,122 A | 7/1988 | Kubo |
| 4,763,401 A * | 8/1988 | Marinoni et al. ............ 901/30 X |
| 4,766,775 A | 8/1988 | Hodge |
| 4,815,780 A | 3/1989 | Obrist |
| 4,830,569 A * | 5/1989 | Jannborg .................... 901/29 X |
| 4,863,206 A | 9/1989 | Kaufmann |
| 4,883,939 A | 11/1989 | Sagi |
| 4,897,014 A | 1/1990 | Tietze |
| 4,905,938 A | 3/1990 | Braccio et al. |
| 4,906,123 A | 3/1990 | Weskamp et al. |
| 4,990,022 A | 2/1991 | Watanabe et al. |
| 4,993,132 A | 2/1991 | Manz |
| 4,996,753 A | 3/1991 | Jones |
| 5,069,524 A | 12/1991 | Watanabe et al. |
| 5,118,248 A | 6/1992 | Brucher |
| 5,156,481 A | 10/1992 | Overbay et al. |
| 5,167,478 A | 12/1992 | Ramunas |
| 5,186,567 A | 2/1993 | Evenson et al. |
| 5,195,761 A | 3/1993 | Eimer |
| 5,211,693 A | 5/1993 | Pacher |
| 5,243,264 A | 9/1993 | Takada et al. |
| 5,256,128 A | 10/1993 | Neumann |
| 5,261,758 A | 11/1993 | Vranish |
| 5,294,209 A | 3/1994 | Naka et al. |
| 5,328,222 A | 7/1994 | Sartorio et al. |
| 5,372,464 A | 12/1994 | Bureller |
| 5,397,159 A | 3/1995 | Sartorio et al. |
| 5,460,536 A | 10/1995 | Cullen |
| 5,575,597 A | 11/1996 | Bailey et al. |
| 5,607,251 A * | 3/1997 | Rafn ............................ 403/348 |
| 5,624,364 A | 4/1997 | Zimmer |
| 5,632,588 A | 5/1997 | Crorey et al. |
| 5,647,554 A | 7/1997 | Ikegami et al. |
| 5,661,387 A | 8/1997 | Stadele et al. |
| 5,752,904 A | 5/1998 | Irri |
| 5,782,571 A | 7/1998 | Hufford et al. |
| 5,857,815 A | 1/1999 | Bailey et al. |
| 5,879,277 A | 3/1999 | Dettman et al. |
| 5,993,365 A | 11/1999 | Stagnitto et al. |
| 6,000,888 A | 12/1999 | Hartman |
| 6,113,343 A | 9/2000 | Goldenberg et al. |
| 6,116,966 A | 9/2000 | Little et al. |
| 6,290,182 B1 | 9/2001 | Grunditz |
| 6,349,884 B1 | 2/2002 | Thome et al. |
| 6,379,072 B1 | 4/2002 | Brown et al. |
| 6,447,197 B1 | 9/2002 | Hiura |
| 6,533,594 B1 | 3/2003 | Kurup |
| 6,719,677 B2 | 4/2004 | Izumi |
| 6,767,198 B2 | 7/2004 | Weinstein et al. |
| 7,074,129 B2 | 7/2006 | Sugiyama et al. |
| 7,204,792 B2 | 4/2007 | Hagihara et al. |
| 7,210,212 B2 | 5/2007 | Lin |
| 7,252,453 B1 | 8/2007 | Little |
| 7,484,736 B2 | 2/2009 | Allemann et al. |
| 7,559,265 B2 | 7/2009 | Mizuno |
| 7,603,059 B2 * | 10/2009 | Marumoto ................ 403/348 X |
| 7,628,093 B2 | 12/2009 | Madhani et al. |
| 2002/0166403 A1 | 11/2002 | Choset et al. |
| 2004/0012160 A1 | 1/2004 | Krondorfer et al. |
| 2004/0142803 A1 | 7/2004 | Fitzgibbon |
| 2004/0267254 A1 | 12/2004 | Manzo et al. |
| 2006/0017237 A1 | 1/2006 | Lin |
| 2006/0088367 A1 | 4/2006 | Dellach et al. |
| 2007/0228670 A1 | 10/2007 | Norton et al. |
| 2007/0231063 A1 | 10/2007 | Tsutsumi et al. |
| 2007/0293380 A1 | 12/2007 | Kausch et al. |
| 2008/0016979 A1 | 1/2008 | Yasumura et al. |
| 2008/0056859 A1 | 3/2008 | Inoue et al. |
| 2008/0119339 A1 | 5/2008 | Oliver |
| 2008/0132393 A1 | 6/2008 | Jordil et al. |
| 2008/0216596 A1 | 9/2008 | Madhani et al. |
| 2008/0229861 A1 | 9/2008 | Inoue et al. |
| 2008/0232932 A1 | 9/2008 | Jinno |
| 2008/0236324 A1 | 10/2008 | Inoue et al. |
| 2008/0257095 A1 | 10/2008 | Kent |
| 2009/0044655 A1 * | 2/2009 | DeLouis et al. ........... 74/490.05 |
| 2009/0139375 A1 | 6/2009 | Hathaway et al. |

* cited by examiner

ROBUST MANUAL CONNECTOR FOR ROBOTIC ARM END EFFECTOR

CROSS REFERENCE TO RELATED APPLICATIONS

This application is based on U.S. Provisional Patent Application No. 61/268,085, filed Jun. 8, 2009, on which priority of this patent application is based and which is hereby incorporated by reference in its entirety.

BACKGROUND OF THE INVENTION

Manipulators on mobile robots often require specialized end effectors (tools/components) in order to accomplish particular missions. Currently, deployed systems have end effectors designed, built, and installed at the factory. Factory installed tools can only be repaired or replaced in a factory. This limits the effectiveness of the robot to those missions which can be achieved with a single tool. Heretofore, when a new candidate task is identified, the typical response has been to design and build a new robot intended to perform the specific task. Sometimes existing unmanned ground vehicles (UGV) platforms are used, but just as often, a new robot is created to specifically address the task. This has resulted in a proliferation of small UGVs, each performing admirably on tasks within each of its subset of core competencies, but is generally unsuitable for tasks that vary too widely from its essential purpose. It is impractical to expect field teams to carry multiple UGVs, each suited for a specific task. In addition to the strain on the physical resources of the field team (e.g., transportation and maintenance), different robots come with different control schemes. This reduces the ability of the operator to capitalize on the experience and intuition gained from operating previous robots, because the operator cannot rely on the trained reflexes developed while controlling previous robots. In fact, these differing control schemes lead to operator errors and inefficient control.

Another approach has been to design new, more capable robots, but this approach has drawbacks because even if a robot were designed and built to perform all of the tasks currently assigned to UGVs, it would quickly become outdated as new tasks and jobs are identified. Additionally, external variables, such as physical environment, make UGVs designed for one environment wholly impractical for use in another environment, meaning a number of new robot types would need to be designed, tested, and built. Systems with replaceable end effectors are also ineffective because they require a technician and possibly a number of specialty tools. Generally, these changes would require a technician to remove the current tool and to attach its replacement. This may involve physically disconnecting the tool, disconnecting electrical connections, physically attaching the new tool, and hooking up its electrical connections. The system may also require reconfiguring the control software for each specialized tool. Particularly, in time critical applications, such as military or civilian Explosives Ordinance Disposal (EOD), this process is too slow and interferes with missions.

Military and law enforcement groups are increasingly relying on UGVs to perform life-threatening tasks ranging from under car inspection to EOD. As small UGVs, such as Omni-Directional Inspection Systems (ODIS), Talon and Packbot have gained acceptance, the variety of tasks they have been required to perform has increased.

In addition, unlike industrial robots, these systems are deployed in uncontrolled environments. They must have a robust design to survive the normal working environment they will encounter, both during deployment on the mobile robot and when the manipulator and tools are being stored or transported. The mechanical connection must be resilient to minor variations in tolerances of mating components, such as might occur when a tool is dropped or bumps against another tool in the toolbox, or such as might be caused by the presence of debris, such as dirt and sand, from the working environment.

Robotic arms often require specialized configurations to accomplish their particular mission, requiring change in the length of a link in the arm or attaching a different end effector or tool.

Tools that attach to links of the robotic arm that are pivoting or rotating must be able to withstand the large bending movements and torques that result from this.

An object of the present invention is to provide a quick-release assembly for separating robotic end effectors mechanically from their manipulator arms, thus allowing unhindered integration of end effectors as the complexity of the system is contained in the manipulator arms. A further object is to make the end effectors replaceable units that can be replaced by hand when they fail.

SUMMARY OF THE INVENTION

The present invention is an assembly for releasably connecting an end effector to a robotic arm comprising a first joint member having a cylindrical body, a collar, and a locking wall extending from said cylindrical body. The collar is coaxially aligned with and rotatably connected to the locking wall. A second joint member has a cylindrical mating body and a coupler, the cylindrical body of the first joint member being engageable with the mating body of the second joint member. The coupler being engageable in keyed relationship with the locking wall, the coupler and locking collar further includes intervening circumferentially spaced teeth, wherein the collar is rotatable to releasably engage the first joint member with the second joint member. The assembly further includes a locking pin extending axially outward from the collar. An engaging hole is included in the locking wall and a pin in the coupler, wherein the pin is receivable in the engaging hole. Displacement of the first joint member into the second joint member causes the pin to move adjacent the wall, and further displacement of the first joint member into the second joint member is terminated by the wall until alignment of the pin with the engaging hole occurs. The termination of displacement of the first joint member into the second joint member is offset by the length of the pin, wherein the length is within a range to terminate displacement before connections are made between the first joint member and second joint member. The second joint member has electrical connector terminals and the first joint member has engaging holes, whereby engagement causes the electrical connector terminals joined to the engaging holes to form a connection. The pin length terminates displacement before electrical connector terminals and engaging holes.

The teeth of the locking collar and coupler have chamfered edges. The locking collar rotation forces the chamfered edges of locking collar teeth to slide over the chamfered edges of the coupler teeth, wherein the chamfered edges facilitate engagement of the teeth.

The assembly can include a flexible ring placed between a lip of the collar and an end of the first joint member, wherein the ring is compressed between the collar and the first joint member when the collar is releasably engaged to the coupler. The locking wall of the first joint member includes a notched surface for engagement with a pin of the locking collar. The locking pin is a spring loaded retaining pin. The alignment ring can be aligned coaxially within the coupler for receiving said first joint member. The second joint member and first joint member can engage to form an electrical connection operative to transmit images, control signals, activators, identification information, video, USB, TCP/IP, UDP, and Can-Bus.

A non-limiting list of components of the present invention can include a manipulator arm, a boom arm, a stick arm, a gripper, a gimble grip, a flexible joint, a tilt table, a dozer, a shovel, a plow, a pan tilt table, or a digger.

The assembly can withstand large forces, in one embodiment, up to 3,000 pounds with the application of a 3 ft-lbs torque to the locking collar by hand.

The quick-release assembly can be connected to a robot arm. A robot end effector quick-release arrangement comprises a first joint member having a cylindrical body, a collar, and a locking wall extending from said cylindrical body, the collar being coaxially aligned with and rotatably connected to said locking wall, and a second joint member having a cylindrical mating body and a coupler, the cylindrical body of the first joint member being engageable with the mating body of said second joint member. The coupler is engageable in keyed relationship with the locking wall, the coupler and locking collar further including intervening circumferentially spaced teeth, wherein the collar is rotatable to releasably engage said first joint member with the second joint member. A robot arm attached to the first joint member with a chip embedded in said robot component and a connection from the component to a control unit with an identification signal, wherein the embedded chip transmits an identification of the component to a control unit through said connection is provided.

Also provided with the present invention is a robot end effector quick-release assembly, comprising a first joint member mounted on a robot component, and a locking collar for attaching to a coupler of a second joint member.

The present invention also teaches a method for connecting a robotic tool to a robotic arm, comprising providing a first joint member having a cylindrical body, a collar, and a locking wall extending from said cylindrical body, a second joint member having a cylindrical mating body and a coupler, displacing the first joint member into the second joint member, aligning the coupler to the first joint member by rotating the coupler having intervening teeth extending radially outward circumferentially spaced on a second end of the coupler from an end of the coupler, at least one of the teeth having a pin therethrough extending axially outward, until the pin mates to an engaging hole of the first joint coupler, whereby the pin of the coupler is received by the engaging hole, causing alignment of the second and first joint member. The intervening teeth of the coupler is rotated into engagement with teeth located circumferentially about the locking collar, wherein the locking collar rotation forces the teeth of locking collar to slide over the teeth of coupler, further wherein the coupler is clamped into engagement with the first joint member; and engaging a retaining pin to lock the collar to the first joint member. The method further includes the step of terminating displacement of the first joint member into second joint member when the pin engages the locking wall.

DESCRIPTION OF THE PREFERRED EMBODIMENTS

Figure 1:
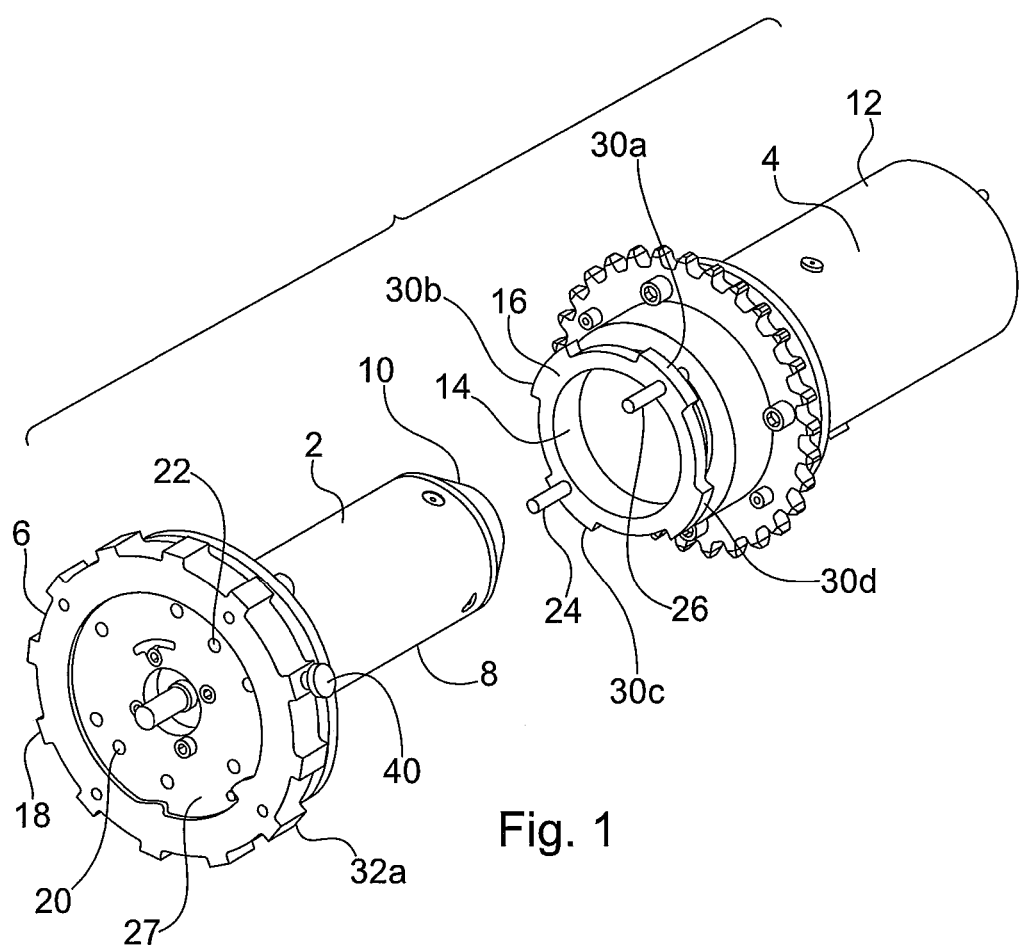
FIG. 1 is a top-perspective view of the male and female coupler components of the quick-release assembly of the present invention.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural reference unless the context clearly dictates otherwise.

Figure 14A:
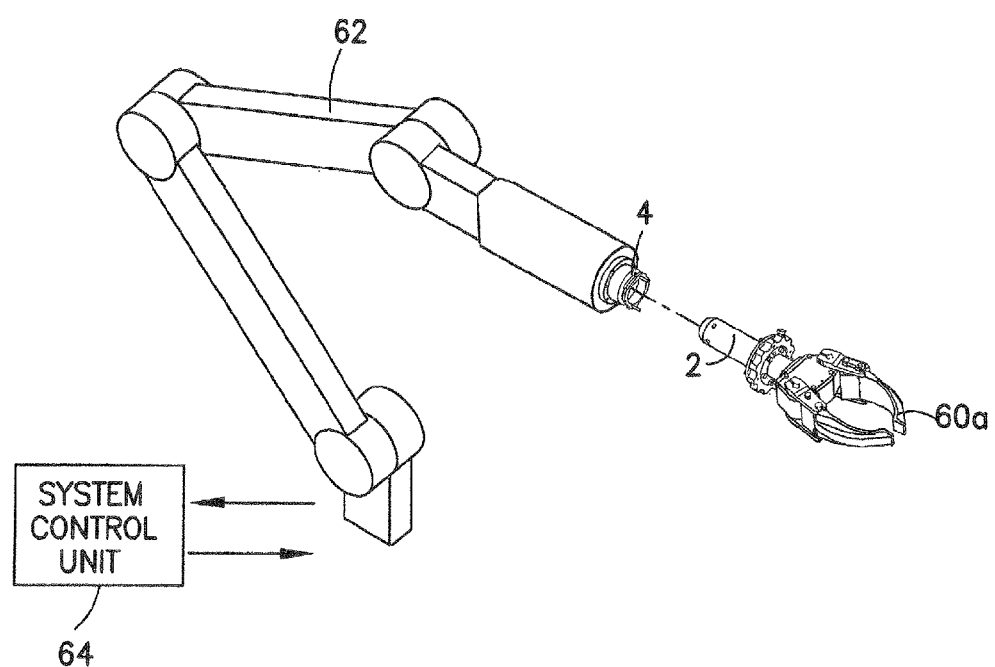
FIG. 14A is a perspective view showing a robot arm, a robot component that is attached to the end of the robot arm, and a system control unit in communication with the robot arm.
Figure 14B:
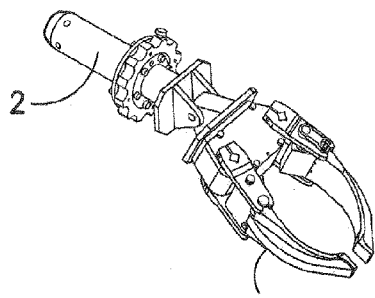
FIGS. 14B-14Q are perspective views showing different robot components that are attachable to the end of the robot arm.
Figure 14C:
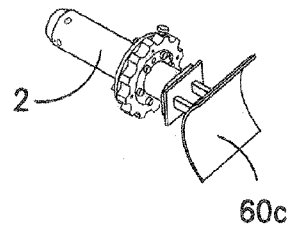
Figure 14D:
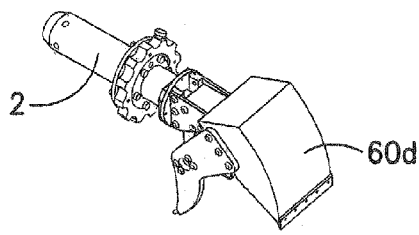
Figure 14E:
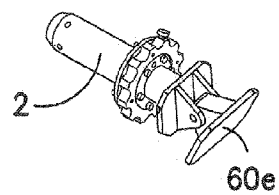
Figure 14F:
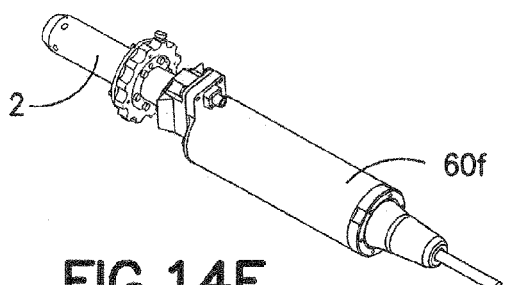
Figure 14G:
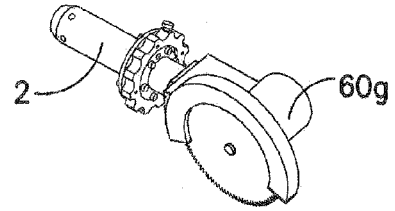
Figure 14H:
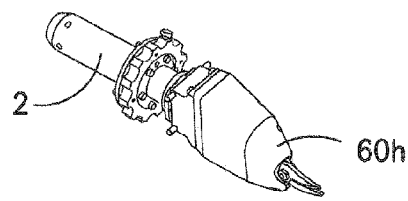
Figure 14I:
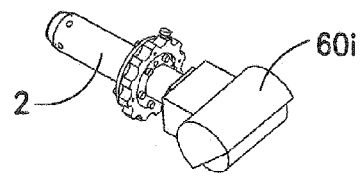
Figure 14J:
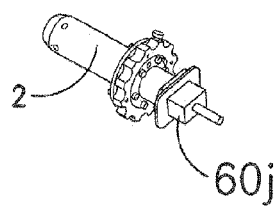
Figure 14K:
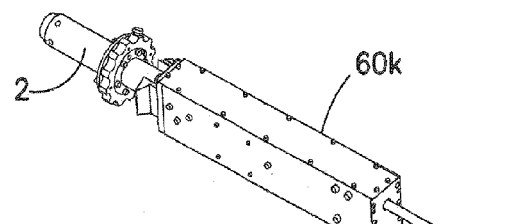
Figure 14L:
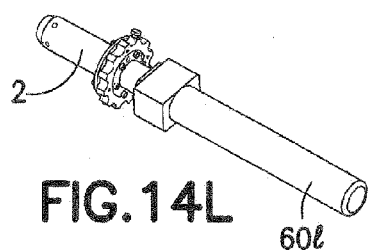
Figure 14M:
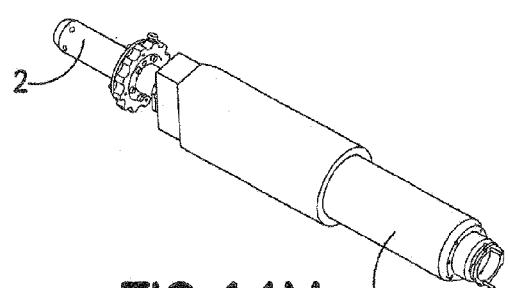
Figure 14N:
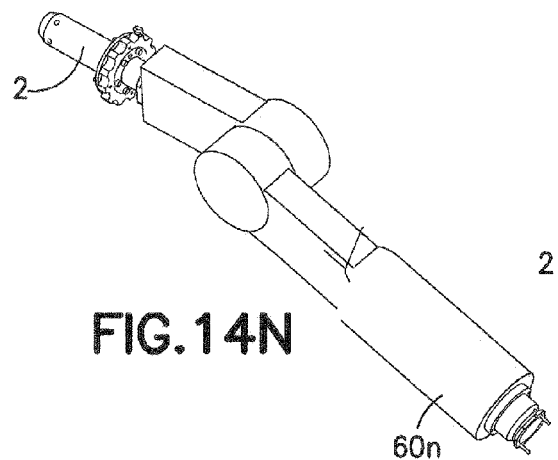
Figure 14O:
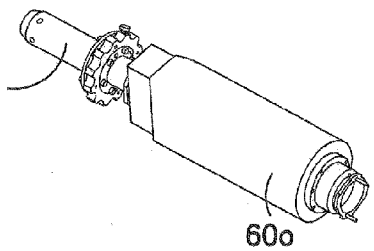
Figure 14P:
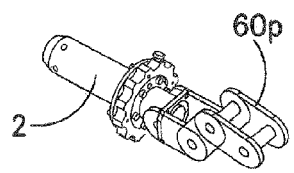
Figure 14Q:
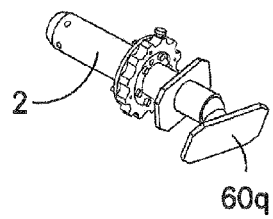

As shown in FIG. 14A, the quick-release assembly can be connected to a robot arm 62. The quick-release assembly provides a light-weight mechanical coupler to change-out tools to a robotic manipulator. The mechanical coupler can rigidly connect an end effector to a robotic manipulator and can include an electrical connection to pass power and signals between the end effector and a manipulator. The connection can also have full pass through power, electrical, and signal capabilities. As shown in FIGS. 14B-14Q, end effectors that can be attached using the quick-release assembly can include components 60 such as a retrievable delivery device, gripper 60a, gimble grip 60b, dozer 60c, shovel/digging tools 60d, tilt table 60e, drills 60f, saws 60g, cutters 60h, grinders 60i, sensors 60j, camera 60k, disruptor 60l, arm extenders 60m, arm linkages 60n, 60o, and pan-tilt table 60q. One skilled in the art will recognize that the use of other types of components with the quick-release mechanism of the present invention is possible.

Figure 15:
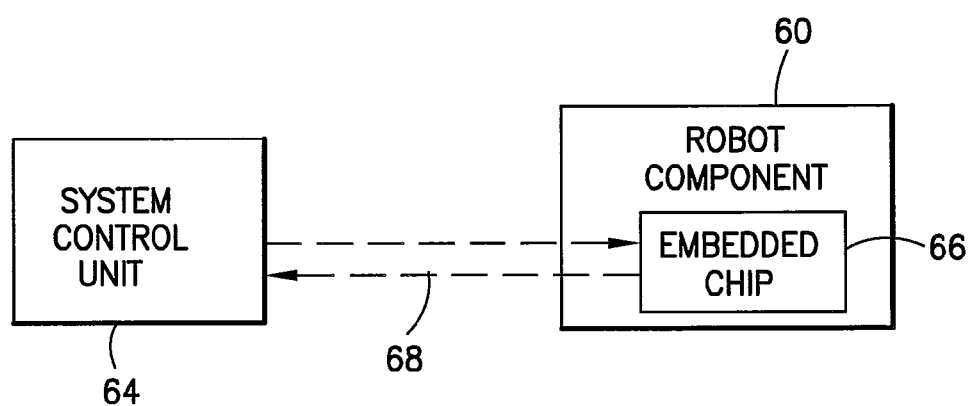
FIG. 15 is a schematic drawing depicting the communication between an embedded chip in a robot component and a system control unit.

A further object of the invention is adaptability. End effectors can operate seamlessly since they can be plug-n-play. In one embodiment, as shown in FIG. 15, an operator control unit 64 can identify the current end effector and the current controller by reading an embedded chip 66 in the end effector and can pass electrical signals to control the end effector through the quick-release assembly of the present invention. The embedded chip 66 can contain a unique identifier 68 for the particular end effector. Therefore, when a new end effector is attached using the quick-release assembly of the present invention, a unique identifier 68 for the tool can be read and passed to an onboard or external computer system that can analyze the signal 68 to identify the present end effector. The information can be used in programming instructions on an operator control unit 64 to operate the end effector accordingly. Alternatively, other types of electronic components can be used to produce an identifier signal, such as a jumper or resistor operative in the end effector to send a valve that can identify a component.

With reference to FIG. 1, a quick-release assembly of the present invention is shown including a first joint member and a second joint member coupled together to form a connection between a robotic manipulator of a robot. The first joint member can be a male coupler 2 and the second joint member can be a female coupler 4. Male coupler 2 includes a locking collar 6, a support tube 8, and electrical housing 10. The female coupler unit 4 includes a retaining tube 12 having a cylindrical cavity 14 formed therein for receiving the electrical connector housing 10 and support tube 8 of the male coupler unit 2. The locking collar 6 can be a substantially cylindrical body rotatable about a circular locking wall 28 positioned on the first end 18 of the male coupler unit 2. The locking collar 6 can further include engaging holes 20 and 22, which can be mated to keying pins 24 and 26 of the female coupler unit 4 when the support tube 8 of male coupler unit 2 is inserted into cavity 14 of the female coupler unit 4. During engagement of the coupler units, the female coupler unit 4 receives the male coupler unit 2, the keying pins 24 and 26 of female coupler 4 are pressed up against first wall 28 at first end 18 of male coupler 2. When the keying pins 24 and 26 are positioned against wall 28, they will stop the displacement of the male coupler unit 2 into the female coupler unit 4. At this point in the engagement, the female coupler unit 4 will not advance until the key pins 24 and 26 are aligned with the holes 20 and 22. The female coupler or male coupler 2 can be rotated and the keying pins 24 and 26 being pressed against wall 28 will not be allowed into further vertical movement until they eventually mate with the engagement holes 20 and 22 of the locking collar 6. After the keying pins 24 and 26 are aligned with the keying pin holes 20 and 22, the keying pins 24 and 26 slide into the holes 20 and 22 and the male coupler 2 is further displaced into female coupler 4. The displacement of the male coupler unit 2 into the female coupler unit 4 can continue until the units are engaged.

Figure 2:
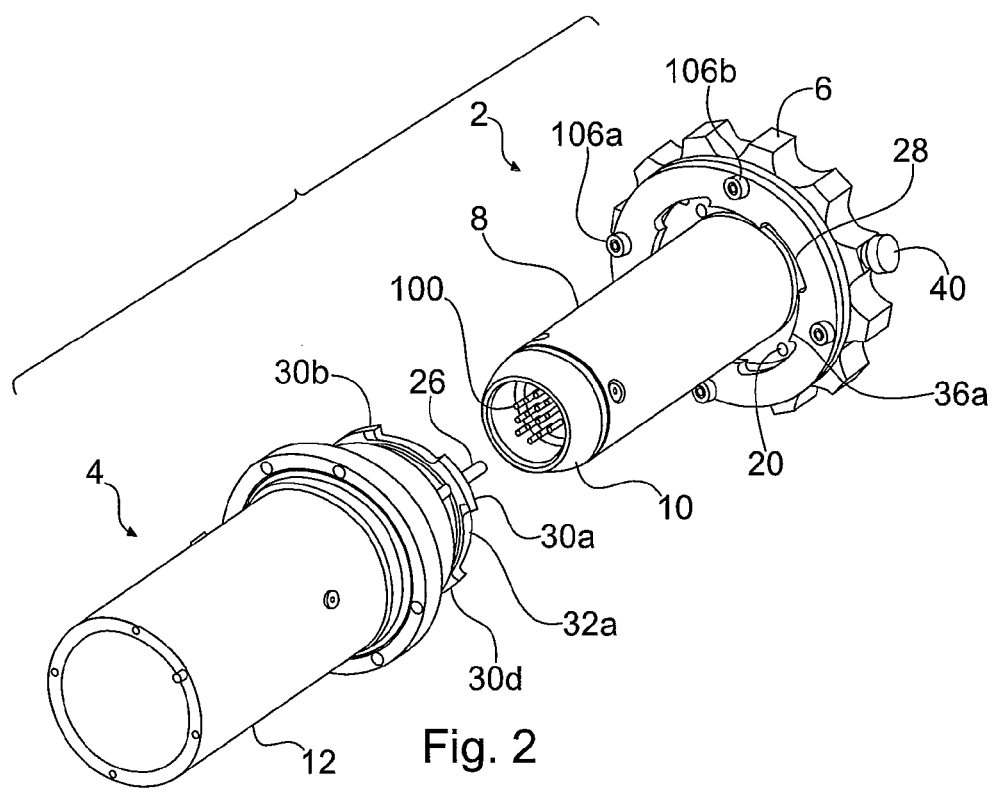
FIG. 2 is a top-perspective view of the mechanical coupler components of the quick-release assembly of the present invention.

One object of the key pins 24 and 26 is to facilitate the mating of the internal components of male coupler 2 and female coupler 4. As shown in FIG. 2, the electrical connector 100 engages an electrical connector unit 102 of female coupler 4 (shown in FIG. 7). It is important that the electrical connector units of electrical connector 100 shown in FIG. 2 are aligned properly with the electrical connection receivers 102 of the female coupler unit 4 before engagement. The keying pins 24 and 26 can be designed to only mate with the respective correct keying pin holes 20 and 22. In addition, the pins 24 and 26 can be provided with a length which is sufficient to stop engagement of the internal components until alignment is correct. In other words, no internal parts can be connected until the keying pins 24 and 26 are aligned with the proper keying pin holes 20 and 22 at which time the engagement process can continue. One skilled in the art can recognize the combination of pin orientation and pin length can vary according to the specific placement of component parts.

With continuing reference to FIG. 2, as the engagement process continues, the female coupler unit 4 further includes at one end 16 a set of radial teeth 30a, 30b, 30c, and 30d. The teeth 30a-30d are equally spaced circumferentially about the outer surface of female coupler unit 4 and facing radially outward having engaging surfaces 32a, 32b, 32c, and 32d on the interior wall of respective teeth 30a-30d. The male coupler unit 2 also has radial members, formed of a set of teeth 36a, 36b, 36c, and 36d spaced circumferentially radially inward about the axis of male coupler unit 2. The teeth 36a-36d have engaging surfaces 38a, 38b, 38c, and 38d on interior wall of respective teeth 36a-36d. When the male coupler unit 2 is engaged with the female coupler unit 4, the engaging surface 32a-32d of the teeth 30a-30d are mated with the engagement surfaces 38a-38d of teeth 36a-36d.

Figure 3A:
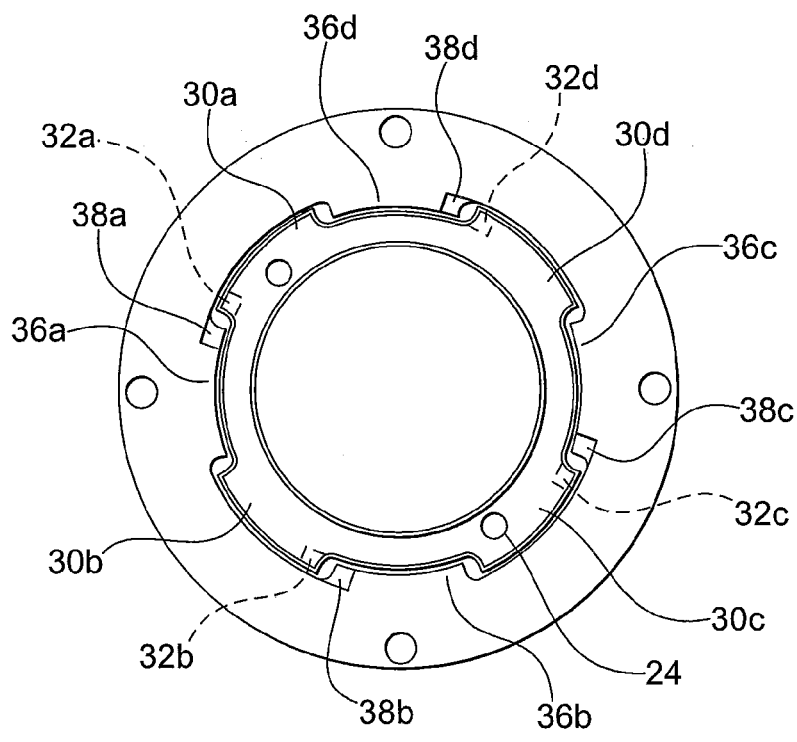
FIG. 3A is a cross-sectional view of the male and female couplers showing the teeth when the quick-release unit is disengaged.
Figure 3B:
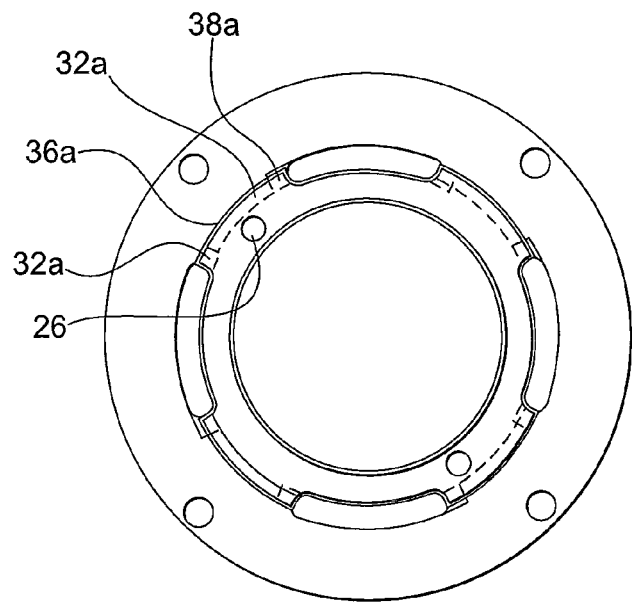
FIG. 3B is a cross-sectional view of the male and female coupler components of the connector showing the male and female teeth in the engaged position of the present invention.

With reference to FIGS. 3A and 3B, the teeth 36a-36d of the male coupler unit 2 and 30a-30d of the female coupler unit 4 are shown in an open position in FIG. 3A. In an embodiment of the present invention, surfaces 38a-38d and surfaces 32a-32d can be chamfered to facilitate the mating of the surfaces. As the female coupler unit 4 is rotated counter clockwise, the chamfered edged surfaces 32a-32d of the teeth 30a-30d will mate with surfaces 38a-38d. When displaced together, the surfaces 38a-38d of the male teeth 36a-36d slide past the female surfaces 32a-32d and mate the teeth 30a-30d and 36a-36d. The female coupler unit 4 and the male coupler unit 2 are mated by rotating one or the other, or both, causing the teeth 30a-30d and 36a-36d to become engaged as shown in FIG. 3B. When the quick-release assembly is closed, the teeth are adjacent and mated. To achieve the closed position, as shown in FIG. 3B, the locking collar 6 can be used to rotate the male coupler unit 2, thereby forcing the chamfered ramps on the teeth surfaces 32a-32d and 38a-38d to slide onto and past each other. As the locking collar 6 is further rotated, any excess space between the teeth 30a-30d and 36a-36d is displaced and they are brought into tight contact with each other. Rotation of the locking collar 6 causes a clamping action between the teeth 30a-30d and 36a-36d, thereby forming a tight fit. When the unit is fully engaged, the locking collar 6 will hit a mechanical stop and further rotation is halted.

Figure 4:
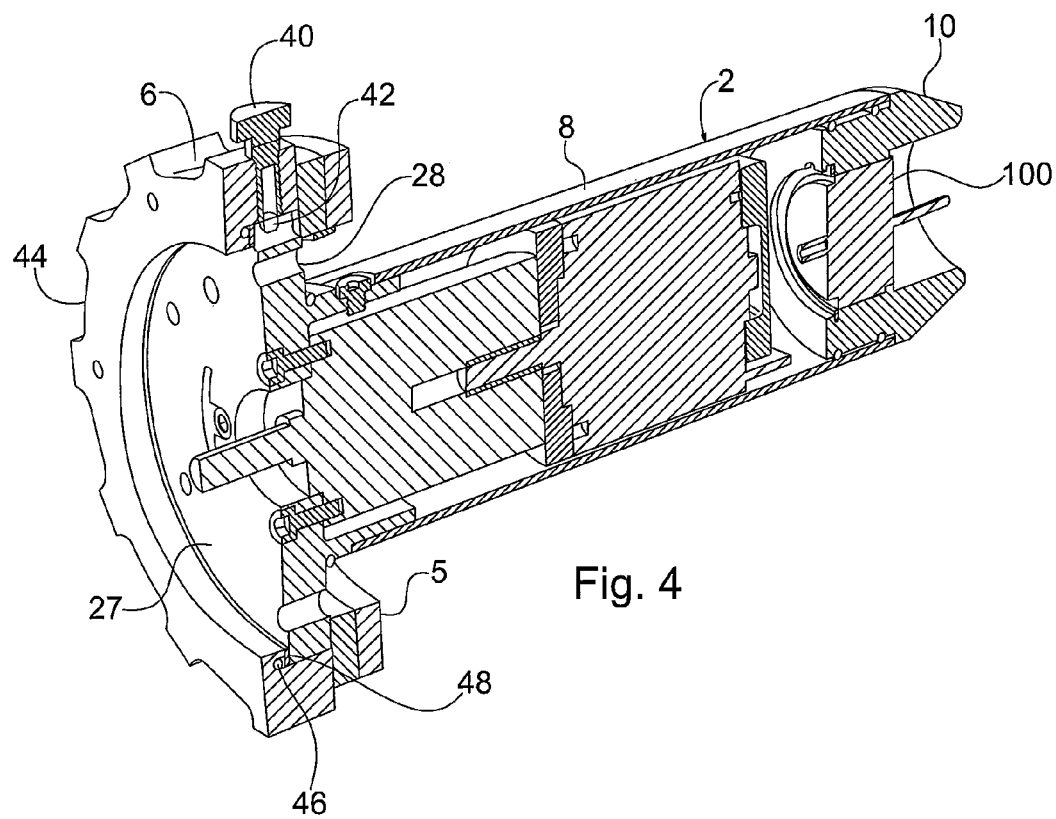
FIG. 4 is a cross-sectional side view of the male coupler unit of the present invention.

With reference to FIG. 4, the locking collar 6 is shown with retaining pin 40 locked. When locking collar 6 is in an open state, the retaining pin 40 is positioned about the locking surface 44 and presses into the male coupler unit 2. The retaining pin 40 engages locking hole 42 to form a detent such that the retaining pin 40 can be released by pulling on the head of the retaining pin 40 until the force applied withdraws the retaining pin 40 form the locking hole 42 and the locking collar 6 is thereby free to rotate about the locking surface 44 of the male coupler unit 2.

With continued reference to FIG. 4, the male coupler unit 2 is shown further including an O-ring 46, positioned between the locking surface 44 of the locking collar 6, and washer 48 positioned adjacent a wall 27 at one end of male coupler 2.

Figure 5:
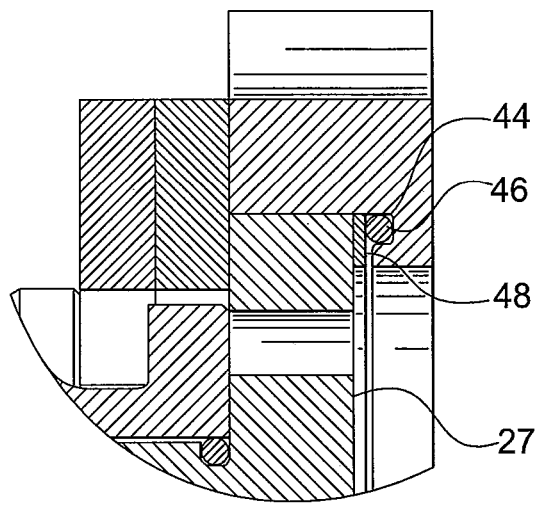
FIG. 5 is a portion of the view shown in FIG. 4 taken along the broken lines of an O-ring in the male coupler enlarged for magnification purposes.

With reference to FIG. 5, the O-ring 46 is shown uncompressed. The O-ring 46 is resting between the unlocked locking collar 6, washer 48, and the locking surface 44 of male coupler unit 2.

Figure 6A:
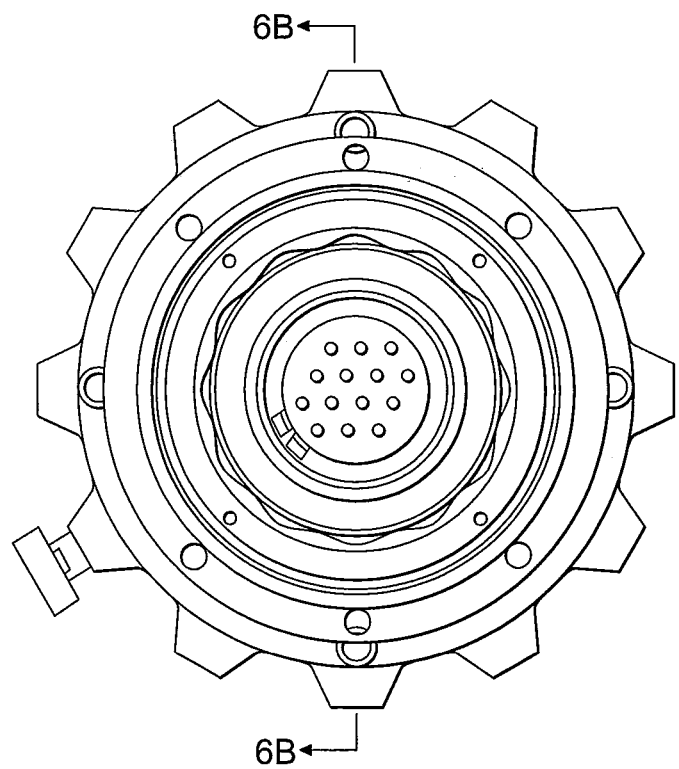
FIG. 6A is a front view showing a male and female coupler engaged.
Figure 6B:
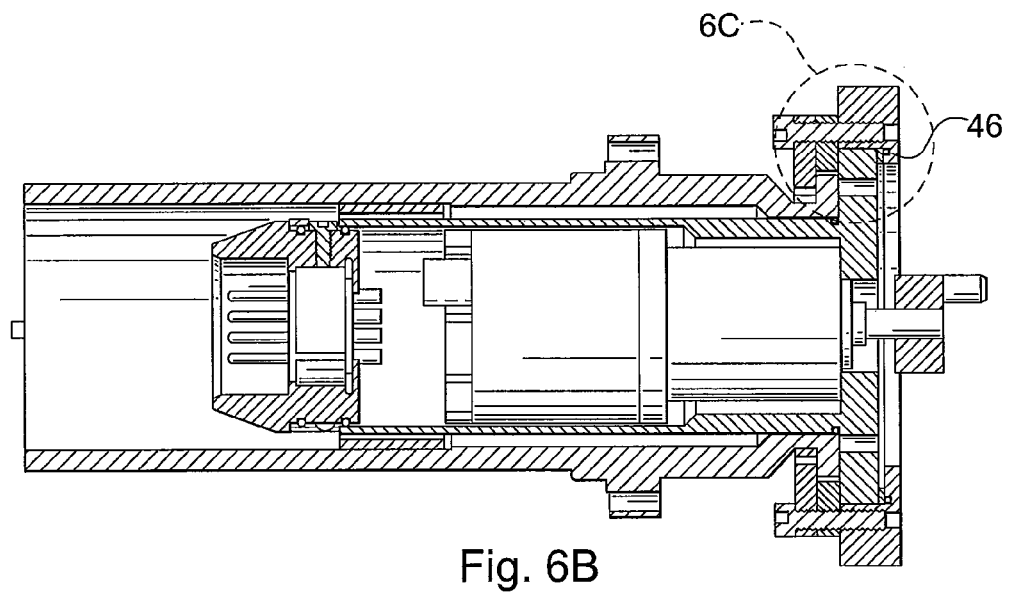
FIG. 6B is a cross-sectional view of the object depicted in FIG. 6A taken along the broken lines, marked 6B with the arrows indicating the direction of sight.
Figure 6C:
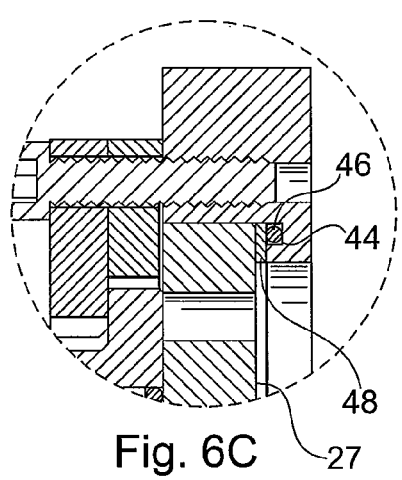
FIG. 6C is a portion of the view shown in FIG. 6B enlarged for magnification purposes.

As shown in FIGS. 6A and 6B, the locking collar 6 is now in an engaged position and couplers 2 and 4 forming a compressed and complete engagement. FIG. 6C is an enlarged view of the surfaces shown in 6A and 6B showing the locking surface 44 being forced toward the washer 48 and surrounding wall 27, causing the compression of O-ring 46 as the locking collar 6 is rotated therebetween. As force is applied and the O-ring 46 is compressed, a resistance is formed between the locking surface 44 of the locking collar 6 and the locking surface 27 of male coupler unit 2. As shown in FIG. 6C, the positioning of the O-ring 46 enables the device to provide slack between coupler 2 and coupler 4 and, therefore, allows the quick-release assembly to make a rigid connection. It also reduces the need for adjustment of the couplers to form a tight fit.

Figure 7A:
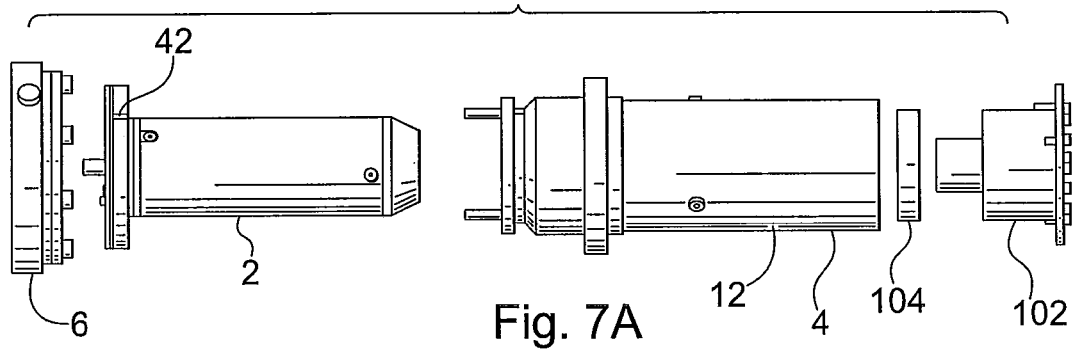
FIG. 7A is an exploded view of the coupler components of the present invention.
Figure 7B:
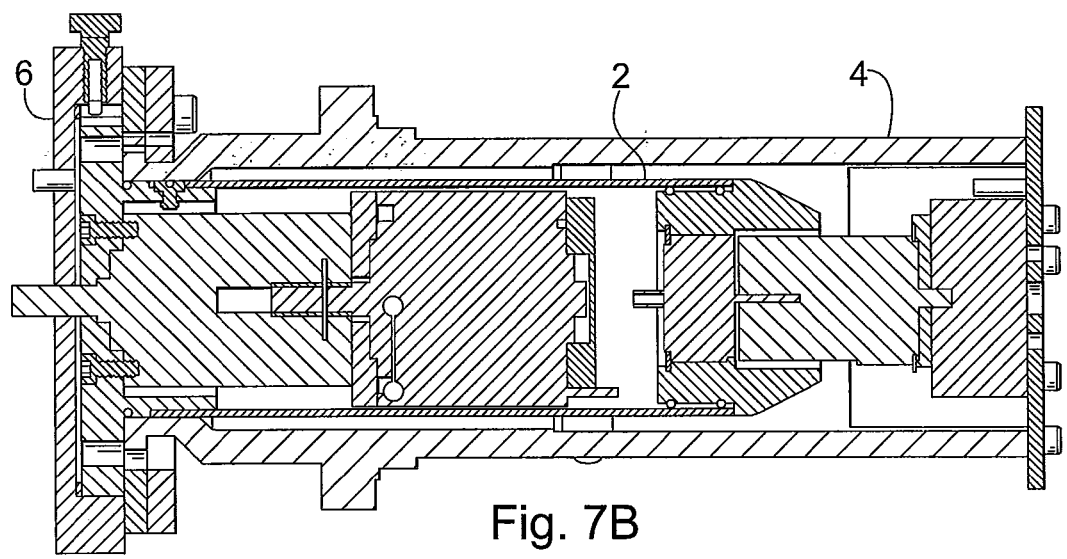
FIG. 7B is a cross-sectional view of the engaged coupler components of the present invention.

With reference to FIG. 7, the female coupler unit 4 can further include a female electrical connector 102 and secondary alignment ring 104. Electrical connector 102 and secondary alignment ring 104 are positioned internal to the retaining tube 12 of the female coupler unit 4. As discussed previously, the female electrical connector 102 mates with the male electrical connector 100, as seen in FIG. 2, inside the male coupler unit 2 as the male coupler unit 2 is displaced into the female coupler unit 4.

Figure 8:
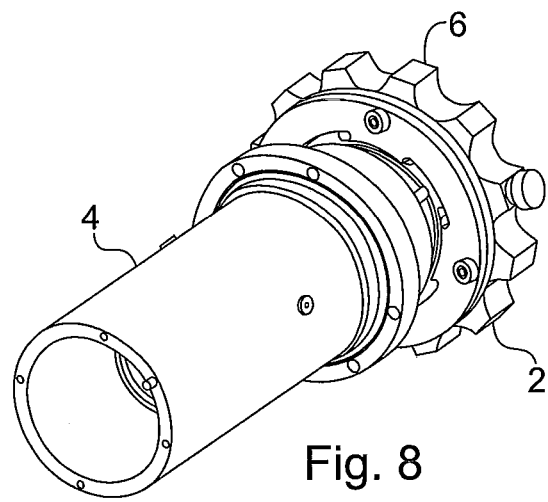
FIG. 8 is a top-perspective view of the mated coupler components in the unlocked position of the present invention.

With reference to FIG. 8, the male coupler unit 2 and female coupler unit 4 are not locked and the teeth 30a-30d and 36a-36d are shown in the unaligned position.

Figure 9:
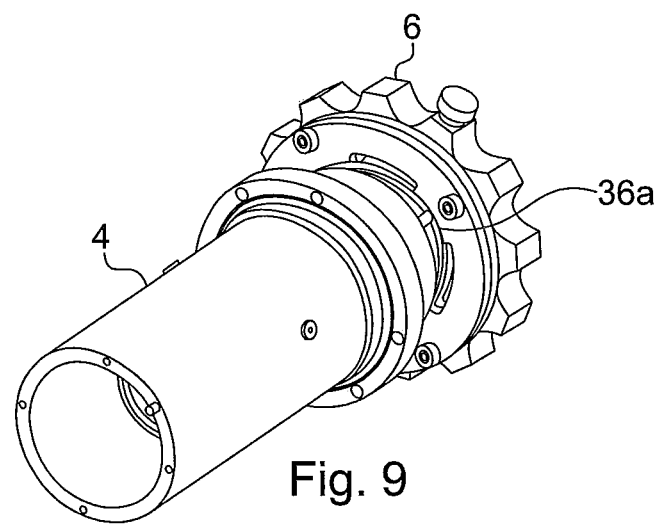
FIG. 9 is a top-perspective view of the engaged coupler components in the locked position of the present invention.

With reference to FIG. 9, the male coupler unit 2 and female coupler unit 4 are shown with the locking collar 6 engaged and the teeth 30a-30d and 36a-36d aligned.

Figure 10:
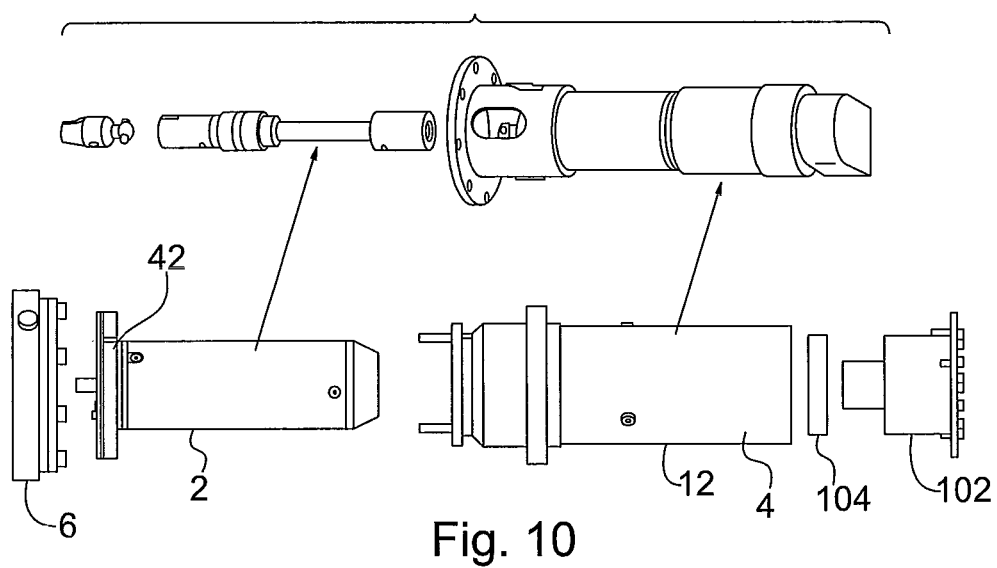
FIG. 10 is a side view of a locking collar having a power transfer device.

With reference to FIG. 10, male and female coupler units are shown having a power transfer unit. To allow for inexpensive tools (by removing the motor and motor controllers), tools may require a source of mechanical power to drive the tool, such as a rotating shaft. However, some tools may require additional motors, processors, or sensors so connections for electrical power and electrical control signals are also required. The control software may require electrical connections from the tool to convey sensor information from the tool, as well as information which identifies the tool that is currently attached, United States Application Publication No. 2009/0044655, filed Jul. 3, 2008, is incorporated herein, showing an example of such an arrangement. In addition, feedback information can propogate back to the end effector. The electrical connector can transmit additional information including images, control signals, activators, identifiers, video, Universal Serial Bus (USB), Transmission Control Protocol/Internet Protocol (TCP/IP), User Datagram Protocol (UDP), CanBus, or jumper pin identifiers.

Figure 11:
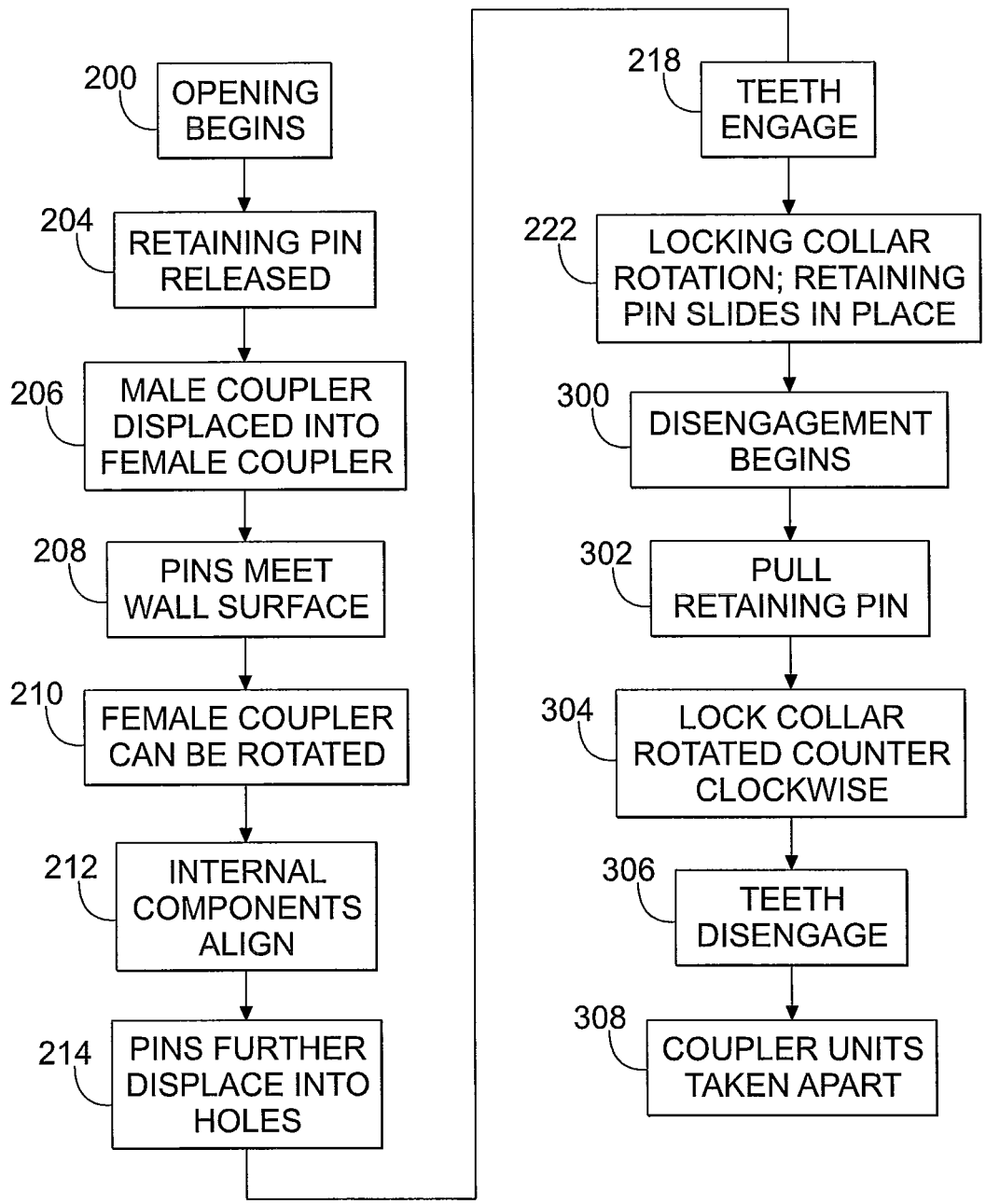
FIG. 11 is a block diagram showing the method steps in accordance with the present invention.

With reference to FIG. 11, a method of opening a locking collar 6 begins at block 200. At conditional block 204, if the locking retaining pin 40 is released, the locking collar 6 can be turned. If not, the locking collar 6 is in a locked position. At block 206, the male coupler unit 2 is displaced into the female coupler unit 4. At block 208, if the male coupler unit 2 has been sufficiently displaced into the female coupler unit 4, the pins 24 and 26 of the female coupler unit 4 will meet the locking wall surface 28 of male coupler unit 2. At block 210, after the pins 24 and 26 meet the wall 28, the female coupler unit 4 can be rotated until the pins 24 and 26 engage the holes 20 and 22.

Alternatively, the male coupler unit 2 can be rotated until the female coupler unit 4 mating pins 24 and 26 engage with the mating holes 20 and 22 of the male coupler unit 2.

At conditional block 212, when the pins 24 and 26 are aligned, the method can continue because internal components are aligned. At block 214, the pins 24 and 26 are further displaced into the mating holes 20 and 22 and the internal components such as electrical receivers 102 of the female coupler unit 4 are coupled with the internal components such as electrical connectors 100 of the male coupler unit 2 and further, an alignment ring 104 aligns the male coupler unit 2 as it is displaced into the female coupler unit 4. If the pins 24 and 26 are displaced fully into the mating holes 20 and 22, the locking collar 6 can be rotated. Rotating the locking collar 6, at block 218, causes the engagement of teeth 30a-30d of the female coupler unit 4 with the teeth 36a-36d of the male coupler unit 2. Further rotation of the locking collar 6 forces the male teeth 36a-36d to slide outside of the female teeth 30a-30d and pull the teeth 30a-30d of female coupler unit 4 toward the wall 28. This movement of the teeth together causes movement of the locking surface 44 toward washer 48 and surrounding wall 27, thereby compressing the O-ring 46 positioned between.

At block 222, locking collar 6 rotation continues until the locking collar 6 locks to the couplers 2 and 4. In one embodiment, the rotation can be a ⅛ rotation. After the locking collar 6 rotation stops at block 222, the wall detent 42 in the locking retaining pin 40 slides into a corresponding hole. The engagement of the locking collar can be achieved with little relative force compared to the amount of force in the assembly. In one embodiment force of up to 3,000 pounds is achieved with under 3 ft-lbs of actuation torque applied by hand to locking collar 6. Although aluminum is used in the preferred embodiment, other types of materials can be used to achieve strength or to effect weight. These materials include steel, titanium, stainless steel, brass, carbon composite, acetal resin, fiber glass composite, polyethelyne, or plastic.

To disengage the quick-release assembly, first at block 300, disengagement begins. At block 302 the detent is disengaged by pulling the head of the locking retaining pin 40. At block 304, the locking collar 6 is rotated, in this case counter clockwise, until the locking collar 6 disengages. At block 306, as the locking collar 6 is rotated counter clockwise, the teeth 30a-30d of the female coupler unit 4 and 36a-36d of the male coupler unit 2 are disengaged and slide away from each other forming an open engagement. At block 308, the female coupler unit 4 and male coupler unit 2 can be pulled apart freely.

Figure 12:
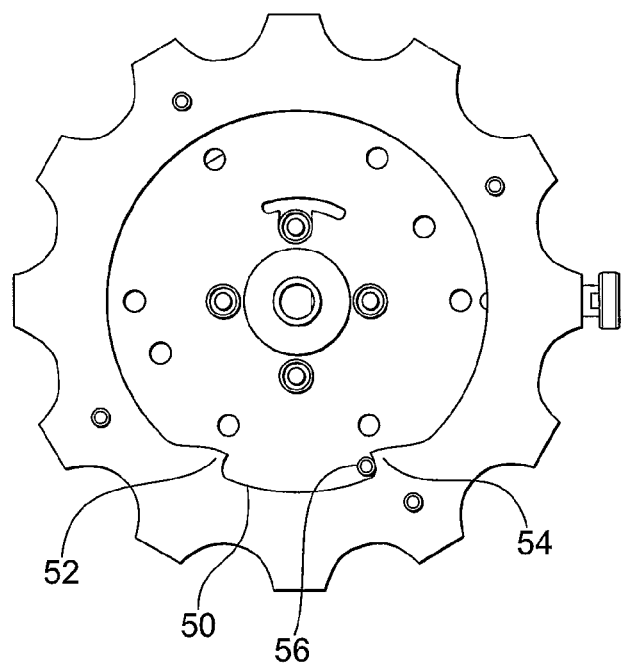
FIG. 12 is a front view of male coupler in engagement position.

With reference to FIG. 12, in one embodiment, the mechanical stop is formed of a slotted surface 50, defined by a first lip 52 and a second lip 54 of the locking collar 6, where the slotted surface interacts with a dowel pin 56 on surface 27. When the locking collar 6 is rotated to open, the locking collar 6 moves in relation to dowel pin 56, as seen in FIG. 12.

Figure 13:
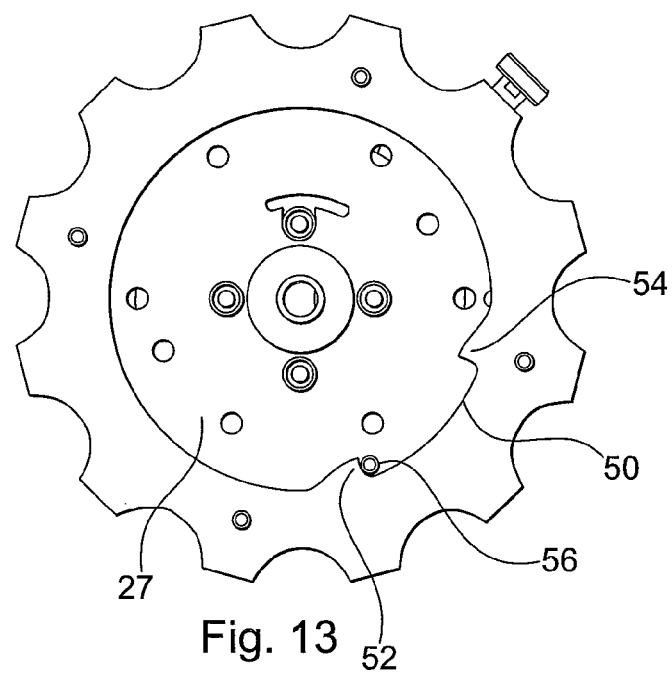
FIG. 13 is a front view of male coupler in disengaged position.

With reference to FIG. 13, when locking collar 5 is moved to engagement position, the locking collar 6 moves in relation to dowel pin 56 until lip 52 engages dowel pin 56, causing the locking collar 6 to stop rotation. The movement of the slotted surface 50 of locking collar 6 about the dowel pin 56 therefore forms the mechanical stop. One skilled in the art will recognize that other mechanical stop techniques used to stop rotation of the locking collar 6 are possible.

The invention claimed is:

1. An assembly for releasably connecting an end effector to a robotic arm comprising:
   a first joint member having a cylindrical body, a locking collar, and a locking wall extending from said cylindrical body, said locking collar being coaxially aligned with and rotatable about said locking wall;
   a second joint member having a cylindrical mating body and a coupler, the cylindrical body of said first joint member being engageable with said mating body of said second joint member,
   said coupler being engageable in keyed relationship with said locking wall, said coupler and said locking collar further including intervening circumferentially spaced teeth,
   wherein said locking collar is rotatable to releasably engage said first joint member with said second joint member,
   at least one engaging hole in said locking wall and a pin in said coupler, wherein said pin is receivable in said engaging hole, and
   a locking member extending from said locking collar and engageable with said locking wall, said locking member configured to stop rotation between said locking collar and said locking wall;
   wherein the displacement of said first joint member into the second joint member causes said pin to move adjacent said wall, and further displacement of first joint member into the second joint member is stopped by said wall until alignment of said pin with said engaging hole;
   wherein a length of said pin terminates displacement of said first joint member into the second joint member before an electrical connectors terminal of said second joint member can connect to a plurality of engaging holes of said first joint member.

2. The assembly of claim 1, said locking member further comprising a locking pin extending axially outward from said locking collar.

3. The assembly of claim 1, wherein the termination of displacement of said first joint member into the second joint member is offset by the length of said pin, wherein said length is within a range to terminate displacement before connections are made between the first joint member and second joint member.

4. The assembly of claim 3, wherein said second joint member having electrical connector terminals and said first joint member having engaging holes, whereby engagement causes said electrical connector terminals to join to said engaging holes to form a connection.

5. The assembly of claim 1, comprising chamfered edges on said teeth of locking collar and coupler, wherein rotation of said locking collar forces said chamfered members of locking collar teeth to slide over said chamfered edges of coupler teeth, wherein said chamfered edges facilitate engagement of said teeth.

6. The assembly of claim 5, further including a flexible ring placed between a lip of said locking collar and an end of said first joint member, wherein said ring is compressed between said locking collar and the first joint member when said locking collar is releasably engaged to said coupler.

7. The assembly of claim 5, wherein said locking wall of first joint member includes a notched surface for engagement with said locking member of said locking collar.

8. The assembly of claim 7, wherein said locking member is a spring loaded retaining pin.

9. The assembly of claim 1, further including an alignment ring aligned coaxially within said coupler for receiving said first joint member.

10. The assembly of claim 1, wherein said second joint member and said first joint member are engaged to form an electrical connection operative to transmit feedback information including: images, control signals, activators, identification information, video, USB, TCP/IP, UDP, and/or CanBus.

11. The assembly of claim 1, further comprising a component connected to the first joint member, wherein the component comprises one of an arm linkage, an arm segment, arm extender, a gripper, a gimble grip, a flexible joint, a tilt table, a dozer, a shovel, a plow, a pan tilt table, a digger, a sensor, a disruptor, a drill, a saw, a cutter, a grinder, a digging tool, or a camera.

12. The assembly of claim 1, wherein the assembly can withstand forces up to 3,000 pounds.

13. The assembly of claim 12, wherein an application of under 3 ft-lbs actuation torque is applied to the locking collar by hand.

14. The assembly of claim 1, wherein said second joint member is connected to a robot arm.

15. The assembly of claim 1, wherein said first joint member is connected to a robot component.

16. A robot end effector quick-release arrangement, wherein said arrangement comprises:
   a first joint member having a cylindrical body, a locking collar, and a locking wall extending from said cylindrical body, said locking collar being coaxially aligned with and rotatable about said locking wall;
   a second joint member having a cylindrical mating body and a coupler, the cylindrical body of said first joint member being engageable with said mating body of said second joint member, said coupler being engageable in keyed relationship with said locking wall, said coupler and said locking collar further including intervening circumferentially spaced teeth, wherein said locking collar is rotatable to releasably engage said first joint member with said second joint member;
   at least one engaging hole in said locking wall and a pin in said coupler, wherein said pin is receivable in said engaging hole, wherein the displacement of said first joint member into the second joint member causes said pin to move adjacent said wall, and further displacement of first joint member into the second joint member is stopped by said wall until alignment of said pin with said engaging hole, wherein a length of said pin terminates displacement of said first joint member into the second joint member before an electrical connectors terminal of said second joint member can connect to a plurality of engaging holes of said first joint member;
   a locking member extending from said locking collar and engageable with said locking wall, said locking member configured to stop rotation between said locking collar and said locking wall;
   a robot arm attached to said second joint member;
   a robot component attached to said first joint member;
   an electronic component in said robot component;
   a connection from the electronic component to a control unit; and
   an identification signal, wherein said electronic component is an embedded chip which transmits an identification signal of said robot component to said control unit through said connection.

* * * * *